UNITED STATES PATENT OFFICE.

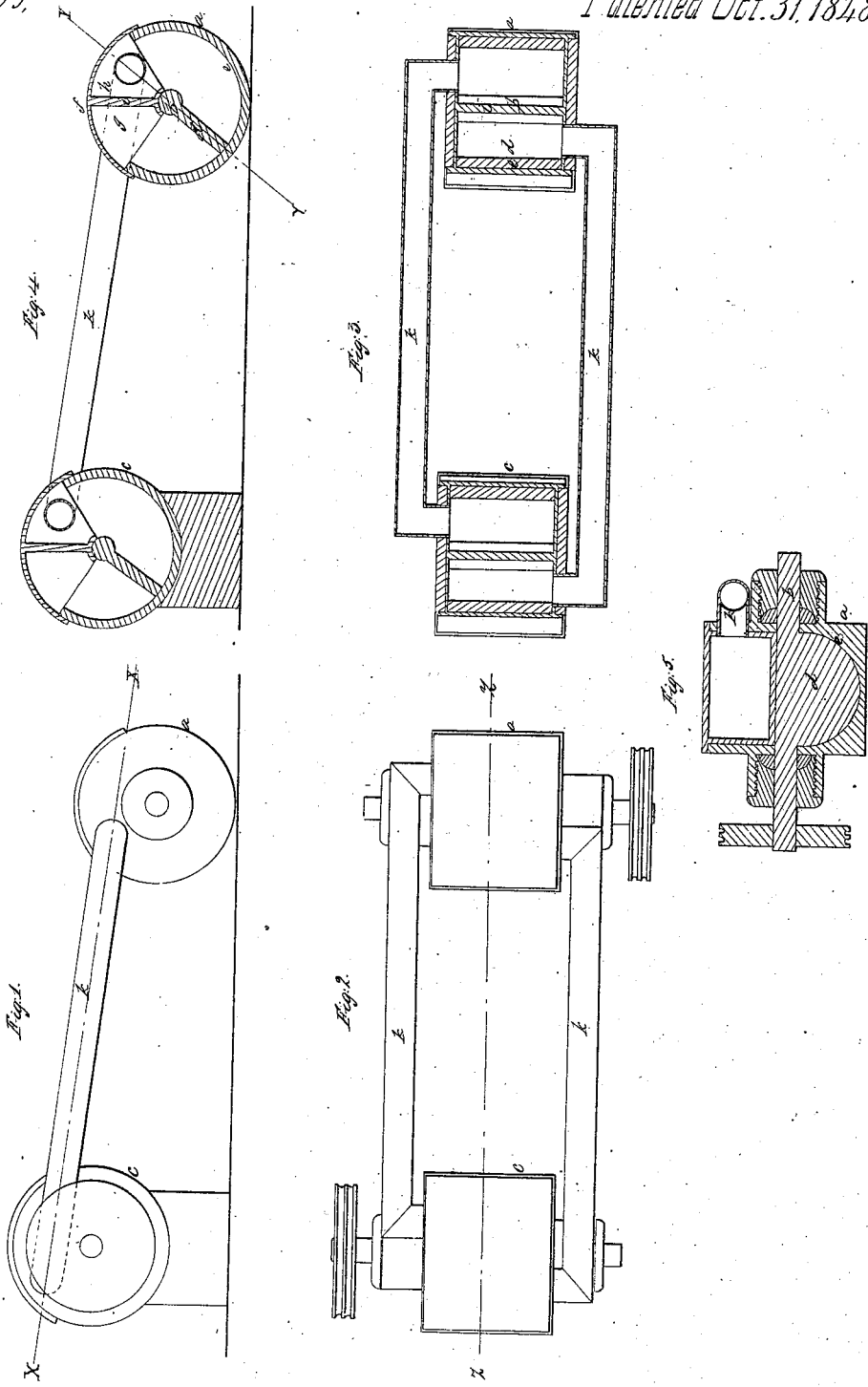

DAVID HINMAN, OF BRUNSWICK, OHIO.

HYDRAULIC APPARATUS FOR TRANSMITTING POWER.

Specification of Letters Patent No. 5,899, dated October 31, 1848.

*To all whom it may concern:*

Be it known that I, DAVID HINMAN, of Brunswick, in the county of Medina and State of Ohio, have invented a new and useful method of Communicating Motion and Power for Moving Machinery at Remote Distances of Altitudes and Around Curves, (which I call "an improved power-communicating hydraulic engine,") and that the following is a full, clear, and exact description of the principle or character which distinguishes it from all other things before known and of the manner of making, constructing, and using the same, reference being had to the accompanying drawings, making part of this specification, in which—

Figure 1 is an elevation of the apparatus; Fig. 2, a plan, Fig. 3, a horizontal section taken in the plane of the line (X, X) of Fig. 1, and Fig. 4, a longitudinal vertical section taken at the line (Z, Z) of Fig. 2; and Fig. 5, a cross section on the line Y, Y, of Fig. 4.

The same letters indicate like parts in all the figures.

Communicating motion and power from any one point to another at a considerable distance whether vertical, horizontal, or inclined, but in straight lines has always been attended with practical difficulties of a very serious nature. If connecting rods be used their flexure not only renders the motion transmitted very imperfect, but frequently, as in the motion of pumps, increases friction and wear to a very serious extent, and if line shafts be substituted, then the friction of the numerous journals becomes the source of a great waste of power; and besides this, the liability to torsion in any material which can be used for line shafts renders them useless as a means of transmitting motion and power to any great distance. These objections, great as they are in communicating motion along straight lines, become much more serious when the connections have to pass along curved lines as in the shafts of mines, where often from the necessity of the case they are very tortuous. These practical difficulties and their magnitude have long been recognized by engineers and mechanicians, but more particularly by miners, and therefore much thought has been directed toward the discovery of some plan which would practically avoid or modify them, but until lately without success. The attainment of this important end is the object of my invention, the nature of which consists in employing two columns of water, or other non-elastic fluid, between two vibrating wings, to transmit the motion and force from the one to the other, as a substitute for connecting rods, line shafts, and all other solid connections.

Motion and force, from some first mover, is given to vibrate a shaft, that is to give the shaft a reciprocating motion on its axis of less than an entire revolution, the shaft being provided with a wing projecting therefrom and adapted to a circular surrounding case in which it vibrates to an extent determined by the capacity of two chambers for the admission and discharge of water through apertures in a double segment chamber that occupies a segment of the annulus formed between the shaft and the inner periphery of the surrounding case, the two ends of the shaft, the edge of the wing piston and the lower edge and ends of the segment chamber being properly packed to prevent the escape of water.

The two segment chambers are each to be connected with the corresponding chambers of a similar hydraulic engine located where the force and motion received by the first is to be given out by means of water tight tubes or pipes which can either be straight or bent to any extent desired to pass through or around any curve desired according to the locality. The vibrating wings of the two hydraulic engines being placed in corresponding positions relatively to the segment chambers in each, and the spaces in which they vibrate, together with the connecting pipes or tubes being completely filled with water any motion given to the wing of the first engine will, by virtue of the interposed water be transmitted to the wing of the other engine, and vibrate it to the same extent, for the entire space between the wings of the two engines being occupied by water, which is for all practical purposes a non-elastic or incompressible body, the least motion communicated to the one will be immediately and without loss transmitted to the other, so that the two columns of interposed water become substitutes for connecting rods without the objections pointed out above.

In the accompanying drawings (a) represents the first engine that is to be operated by any desired first mover, such as a steam engine, water wheel, &c., by any of the known modes of producing a vibratory motion applied to the shaft ($b$) thereof, and ($c$) represents the second engine which is to give out the force and motion communicated to it by the first. As these two hydraulic engines are similar in construction, I will describe one of them only, and then point out the connection between the two. To the shaft ($b$) is attached a wing ($d$) that projects therefrom in a semi-circular form, (but which may be of any other desired form), and adapted to vibrate within a surrounding case ($e$); the shaft passes through the heads of the outer case, and provided with the usual stuffing boxes to prevent the escape of water, the edge of the wing being also well packed in any desired manner to prevent the passage of water between the wing and the periphery of the case in which it vibrates. A hollow double chamber ($f$) of a quadrant form, (but which may be more or less than a quadrant), is placed within the casing ($e$) with its lower edge resting on the shaft and there properly packed, as well as along its ends where it fits against the heads of the case. This segment or quadrant chamber is divided into two compartments ($g$) and ($h$) by a radial partition ($i$), and each of these compartments communicates with a corresponding compartment in the other engine by a pipe ($k$). The vibrating wings will thus be free to vibrate in the cases through that portion of the circle not occupied by the segment or quadrant chamber. The wings in the two engines must be placed in the same position, each relatively to its segment chamber, and then the connecting pipes, the compartments in the segment chamber, and the cases in which the wings vibrate must be entirely filled with water through branch pipes placed at the highest part of the apparatus, that the air in introducing the water may all escape. These feed pipes, which are to be provided each with a cock, are not represented in the drawings as their location will depend entirely on the location of the apparatus.

If my hydraulic power transmitting engine is to be employed for the purpose of pumping water from mines or other places distant from the first mover then I place on the shaft of the second engine a third engine similar in every respect to those described above, except that the compartments in the segment chamber are to be provided each with an induction and eduction valve and pipe for receiving and forcing out the water, and the capacity of this third engine which will be a double action suction and force pump will of course be governed by the quantity of water to be raised and the height to which it is to be forced. But if the object be to operate any other kind of machinery the power is to be taken in any desired manner from the shaft of the second engine.

What I claim as my invention and desire to secure by Letters Patent, is—

The method, substantially as herein described, of transmitting power from any one point to another by means of the two vibrating wings with the two columns of water interposed, substantially as herein described.

DAVID HINMAN.

Witnesses:
ALEX. PORTER BROWNE,
R. W. LOWBER.